US 6,846,036 B2
(12) United States Patent
Stone

(10) Patent No.: US 6,846,036 B2
(45) Date of Patent: Jan. 25, 2005

(54) SKID STEER LOADER WITH INTERIOR MOUNTED REARVIEW MIRRORS

(76) Inventor: Robert William Stone, 5470 SE. Downing Rd., Lathrop, MO (US) 64465

( * ) Notice: Subject to any disclaimer, the term of this patent is extended or adjusted under 35 U.S.C. 154(b) by 41 days.

(21) Appl. No.: 10/284,751

(22) Filed: Sep. 20, 2002

(65) Prior Publication Data

US 2004/0056513 A1 Mar. 25, 2004

(51) Int. Cl.[7] ............................................. B62D 33/06
(52) U.S. Cl. ............................ 296/190.08; 296/190.01; 359/838
(58) Field of Search ...................... 296/190.01, 190.08, 296/190.09, 190.1, 190.11, 1.11; 359/838, 871, 841

(56) References Cited

U.S. PATENT DOCUMENTS 5,342,015 A * 8/1994 Burton et al. ............... 248/478
5,913,566 A * 6/1999 Stauffer et al. ............ 296/190.1
6,149,228 A * 11/2000 O'Neill ..................... 296/190.03
6,293,616 B1 * 9/2001 Williams et al. .......... 296/203.01
2001/0008346 A1 * 7/2001 Martin, Jr. ................ 296/190.08
2001/0011834 A1 * 8/2001 Boyce et al. ............... 296/190.09

* cited by examiner

Primary Examiner—Joseph D. Pape

(57) ABSTRACT

The present invention relates to providing a clear unobstructed view of the immediate area behind a Skid Steer Loader. More specifically, it provides for better safety while backing. Two designs accomplish the unobstructed rear view as follows: 1) A single mirror is mounted onto each of two front support posts of the operator safety enclosure. These mirrors are adjustable, similar to outside mounted automobile mirrors and normally positioned near the top of the support posts. 2) A single mirror is center mounted to a hinged bracket that can easily be moved out of the way when the operator exits the safety enclosure of the Skid Steer Loader. For cold weather operation Skid Steer Loaders are often outfitted with a weather tight safety enclosure and a front door. Both of these designs accommodate the weather tight enclosure with a front door and the more common safety enclosure without a front door.

2 Claims, 3 Drawing Sheets

SECTION A − A
Looking out through the
left support member

SECTION B − B
Looking out through the
right support member

From seated operator position, looking forward
through safety enclosure

SECTION A – A
Looking out through the
left support member

SECTION B – B
Looking out through the
right support member

From seated operator position, looking forward
through safety enclosure

SKID STEER LOADER WITH INTERIOR MOUNTED REARVIEW MIRRORS

BACKGROUND OF THE INVENTION

The present invention relates to providing a clear unobstructed view of the immediate area behind a skid steer loader. More specifically, it provides for better safety while backing.

Currently two people are needed to safely load a skid steer loader onto a trailer for transport. One person drives the skid steer loader while the second person guides the operator onto the trailer with either hand or voice communication.

In confined areas it is difficult to operate a skid steer loader. For example, barns for dairy cattle or horses are often cleaned with skid steer loaders, where passages are narrow and often have obstructing support posts. Operators can only compensate by craning their necks and by memorizing the layout in advance.

In outside environments skid steer loaders are often operated in close proximity to obstructions such as drainage ditches, trees and uneven terrain. Again, operators can only compensate by craning their necks and by memorizing the layout in advance.

Although skid steer loaders were introduced into the U.S. market by the "Bobcat Company" in 1959, mounting of inside mirrors has been prohibited due to the need to enter and exit the operator safety enclosure through the front, see FIG. 2. Exiting either side is blocked by the lift arms. The rear is blocked by the radiator and hydraulic reservoir. The present invention allows for easy access into the operator safety enclosure via either support post mounted mirrors or a hinged mirror mount, see FIGS. 1–3.

DESCRIPTION OF PRIOR ART

The publication Acreage Hotline volume 28 number 1 of Fall 2002 on page 13 displays outside mounted on an Agracat brand skid steer loader. However, these mirrors can not show what is directly behind the skid steer loader, just as side mounted automobile mirrors cannot show objects or people behind the vehicle creates safety hazards. The combination of the outside and inside mounted mirrors provides for the safest operation of the skid steer loader. Outside mirrors alone do not provide the needed safety.

SUMMARY OF THE INVENTION

It is an object of the present invention to provide skid steer loaders with a clear unobstructed view of the area immediately behind the machine, and at the same time allow easy operator entrance and exit to and from the operator safety enclosure area.

Two designs accomplish the unobstructed rear view as follows: 1) a single mirror is mounted onto each of two front support posts of the operator safety enclosure. These mirrors are adjustable, similar to outside mounted automobile mirrors, and normally positioned near the top of the support posts. Locating these mirrors on the support posts allows the lift arms of the skid steer loader to operate without damaging the mirrors. 2) A single mirror is center mounted to a hinged bracket that can easily be moved out of the way when the operator exits the safety enclosure of the skid steer loader. For cold weather operation skid steer Loaders are often outfitted with a weather tight safety enclosure and a front door. Both of these designs accommodate the weather tight enclosure with a front door and the more common safety enclosure without a front door.

DETAILED DESCRIPTION OF THE INVENTION

Figure 1:
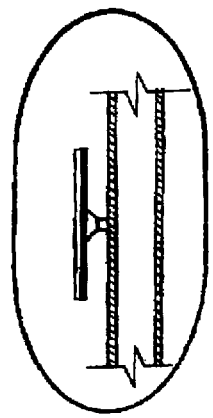
FIG. 1 is a seated operator's perspective view of the support post mounted mirrors in the operator safety enclosure of the skid steer loader.
Figure 1:
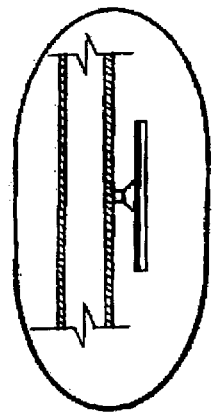
Figure 1:
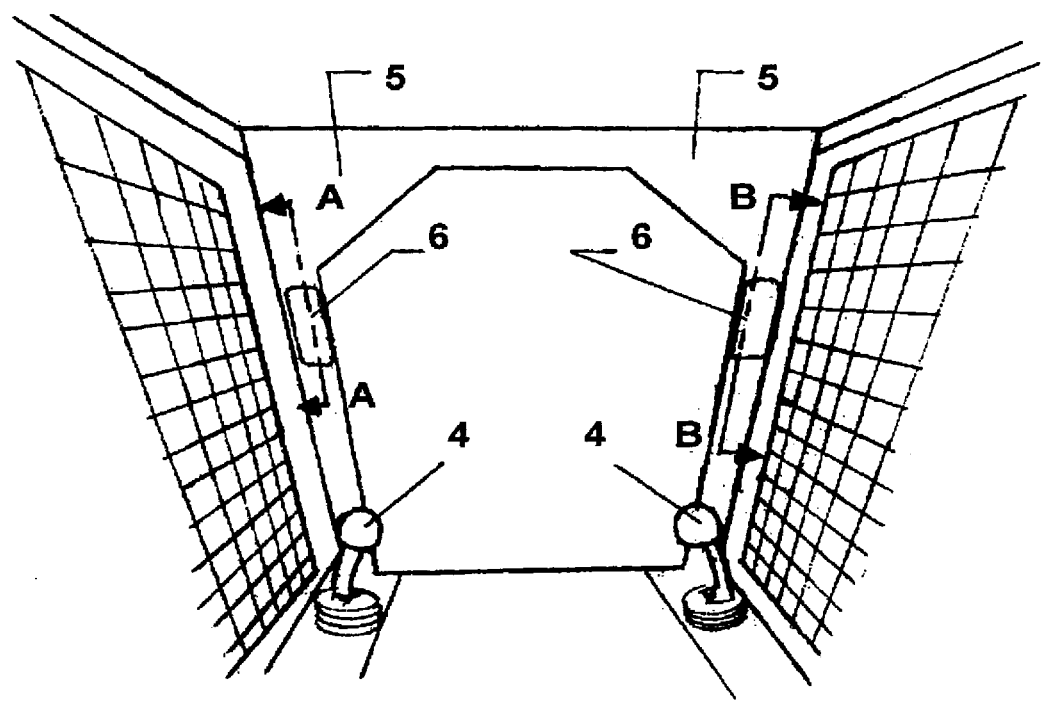
Figure 2:
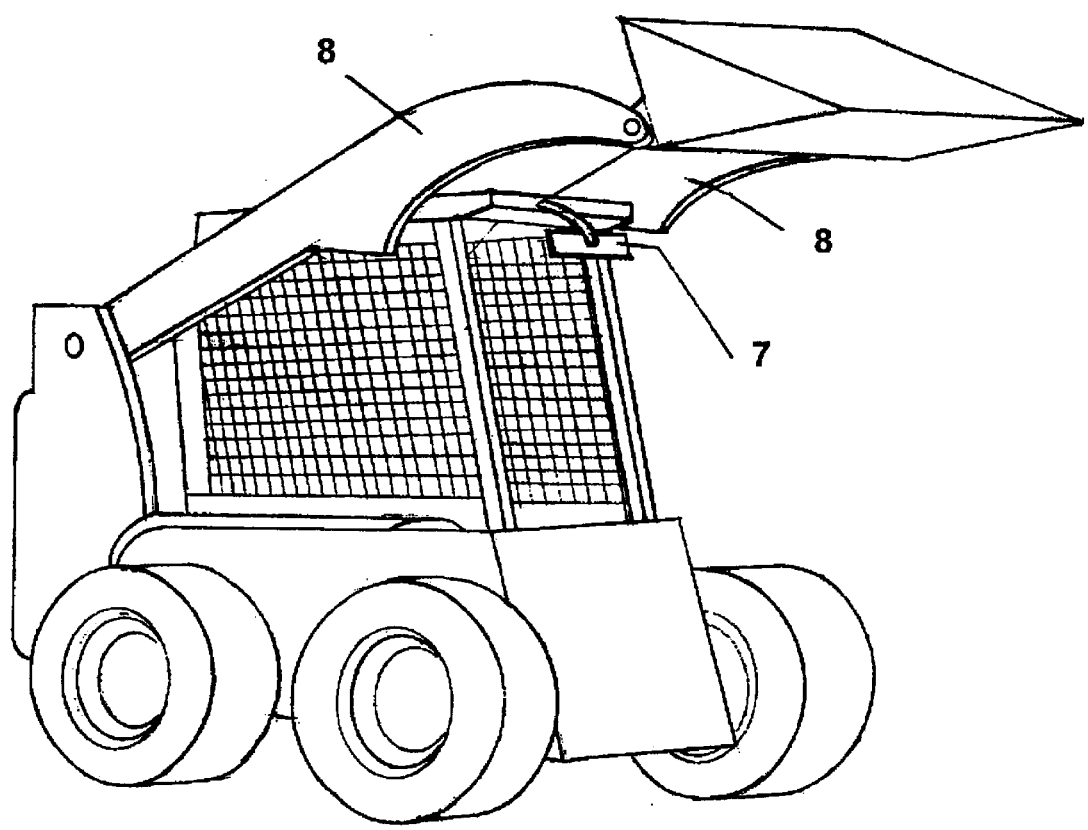
FIG. 2 is a perspective view of the present invention shown with the center rear view mirror.
Figure 3:
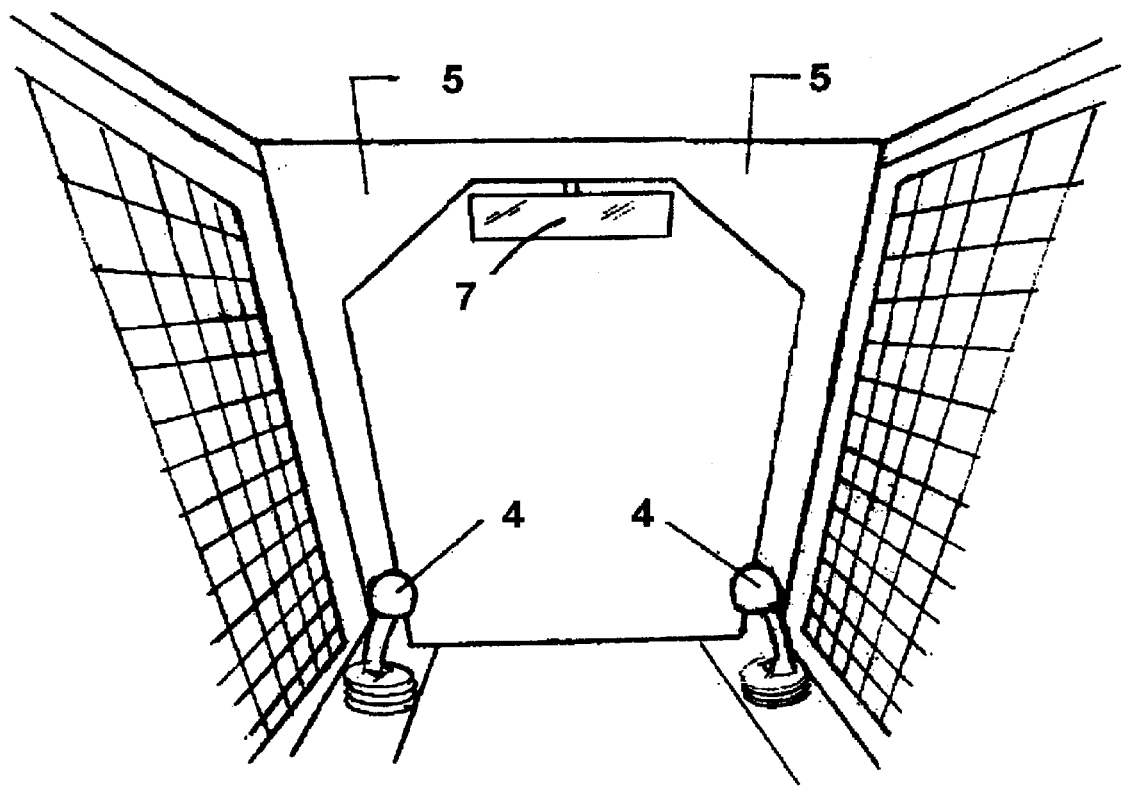
FIG. 3 is a seated operator's perspective view of the front center mounted, hinged bracket, rear view mirror.

FIG. 2 shows a perspective view of a skid steer loader which has a safety enclosure for an operator as well as a pair of lift arms 8. Referring to FIG. 1, an operator's perspective view of a skid steer loader is shown including operator steering controls 4, a top post 5 and a pair of front side posts 5. A single mirror 6 is mounted onto each of the two front support posts 5 of the operator safety enclosure. These mirrors are adjustable and are normally positioned near the top of the support posts. Locating these mirrors on the support posts allows the lift arms of the skid steer loader to operate without damaging the mirrors. FIG. 2 shows another mirror 7 which is mounted to an exterior portion of the safety enclosure. This mirror 7 is center mounted to a hinged bracket that can easily be moved out of the way when the operator exits the safety enclosure of the skid steer loader. Locating this mirror 7 with a center positioning allows the lift arms 8 of the skid steer loader to operate without damaging the mirror. FIG. 3 is an operator's perspective view of the skid steer loader with the center mirror 7 shown.

What is claimed is:

1. A skid steer loader including a safety enclosure, a pair of front side posts and a pair of side mounted lift arms, said skid steer loader further comprising:

an adjustable, rear view mirror mounted on each of said front side posts, wherein said rear view mirrors are positioned completely within the safety enclosure in order to avoid damage thereto by operation of the lift arms;

whereby rear visibility is provided by said mirrors for providing a clear unobstructed view of the area immediately behind the skid steer loader.

2. The skid steer loader of claim 1, wherein a single mirror is center mounted by a hinged bracket to the exterior of the front portion of the safety enclosure so as to be used by an operator of the steer skid loader to provide a clear unobstructed view of the area immediately behind the skid steer loader, whereby the center mirror can easily be moved out of the way for easy forward operator passage into and out of the operator safety enclosure.

* * * * *